US010532512B2

(12) United States Patent
Susnjara et al.

(10) Patent No.: US 10,532,512 B2
(45) Date of Patent: Jan. 14, 2020

(54) ADDITIVE MANUFACTURING APPARATUS

(71) Applicant: Thermwood Corporation, Dale, IN (US)

(72) Inventors: Kenneth J. Susnjara, Birdseye, IN (US); Brian S. Smiddy, Newburgh, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/002,698

(22) Filed: Jun. 7, 2018

(65) Prior Publication Data

US 2019/0375148 A1 Dec. 12, 2019

(51) Int. Cl.
| | |
|---|---|
| *B29C 64/118* | (2017.01) |
| *B33Y 30/00* | (2015.01) |
| *B33Y 10/00* | (2015.01) |
| *B29C 64/209* | (2017.01) |
| *B29C 64/343* | (2017.01) |
| *B29C 48/375* | (2019.01) |
| *B29C 48/63* | (2019.01) |
| *B29C 48/54* | (2019.01) |
| *B29C 48/37* | (2019.01) |
| *B29C 48/585* | (2019.01) |

(52) U.S. Cl.
CPC .......... *B29C 64/118* (2017.08); *B29C 64/209* (2017.08); *B29C 64/343* (2017.08); *B33Y 10/00* (2014.12); *B33Y 30/00* (2014.12); *B29C 48/37* (2019.02); *B29C 48/387* (2019.02); *B29C 48/54* (2019.02); *B29C 48/585* (2019.02); *B29C 48/63* (2019.02)

(58) Field of Classification Search
CPC ....... B29C 48/37; B29C 48/387; B29C 48/54; B29C 48/585; B29C 48/06
See application file for complete search history.

(56) References Cited

U.S. PATENT DOCUMENTS

| | | | | | |
|---|---|---|---|---|---|
| 2,767,437 | A | * | 10/1956 | Marshall | C11D 13/18 264/211.11 |
| 3,863,905 | A | * | 2/1975 | Maxwell | B29C 45/46 425/208 |
| 4,642,040 | A | * | 2/1987 | Fox | B29C 47/0801 264/176.1 |
| 5,224,838 | A | * | 7/1993 | Baumgarten | F04C 13/002 417/205 |
| 5,378,415 | A | * | 1/1995 | Gohlisch | B29C 48/92 264/40.1 |
| 6,893,151 | B2 | * | 5/2005 | Giesler | B29C 48/83 366/78 |
| 7,175,726 | B2 | * | 2/2007 | Abe | B29D 30/30 156/117 |
| 7,238,015 | B2 | * | 7/2007 | Koumo | B29C 48/92 425/149 |

(Continued)

*Primary Examiner* — Benjamin A Schiffman
(74) *Attorney, Agent, or Firm* — Bookoff McAndrews, PLLC

(57) ABSTRACT

An additive manufacturing system may include an extruder. The extruder may include a barrel having a bore. Additionally, the extruder may include an extruder screw at least partially received within the bore of the barrel. The additive manufacturing system also may include a gear pump fluidly coupled to the bore of the barrel. The extruder screw may extend at least partially into the gear pump.

20 Claims, 6 Drawing Sheets

(56) References Cited

U.S. PATENT DOCUMENTS

| | | | | |
|---|---|---|---|---|
| 7,290,923 B2* | 11/2007 | Fischer | ................ | F04C 2/14 |
| | | | | 366/77 |
| 7,341,640 B2* | 3/2008 | Kudo | ............. | B29D 30/3028 |
| | | | | 156/117 |
| 7,607,818 B2* | 10/2009 | Uphus | ............. | B29C 47/0019 |
| | | | | 366/77 |
| 7,731,816 B2 | 6/2010 | Oldani et al. | | |
| 7,810,539 B2 | 10/2010 | Mischler et al. | | |
| 8,151,854 B2 | 4/2012 | Oldani | | |
| 8,534,338 B2 | 9/2013 | Oldani et al. | | |
| 8,851,737 B2* | 10/2014 | Fujiyama | ............. | B29B 7/42 |
| | | | | 366/77 |
| 8,954,180 B2 | 2/2015 | Oldani | | |
| 9,403,309 B2* | 8/2016 | Amurri | ............. | B29C 48/875 |
| 9,566,737 B2* | 2/2017 | Onimatsu | ............. | B29D 30/60 |
| 9,751,269 B2* | 9/2017 | Kitamura | ............. | B29D 30/3007 |
| 9,902,097 B2* | 2/2018 | Onimatsu | ............. | B29D 30/60 |
| 9,944,035 B2* | 4/2018 | Onimatsu | ............. | B29D 30/48 |
| 9,969,122 B1* | 5/2018 | Smiddy | ............. | B29C 64/20 |
| 2002/0153628 A1* | 10/2002 | Giesler | ............. | B29C 48/92 |
| | | | | 264/40.1 |
| 2004/0140583 A1* | 7/2004 | Uphus | ............. | B29B 7/7495 |
| | | | | 264/138 |
| 2005/0184428 A1* | 8/2005 | Kitagawa | ............. | B29C 48/07 |
| | | | | 264/211.23 |
| 2007/0044899 A1 | 3/2007 | Tingley | | |
| 2008/0006017 A1 | 1/2008 | Rindels | | |
| 2010/0200168 A1 | 8/2010 | Oldani et al. | | |
| 2012/0267038 A1* | 10/2012 | Kudo | ............. | B29D 30/3028 |
| | | | | 156/117 |
| 2018/0050479 A1* | 2/2018 | Isaka | ............. | B29C 48/267 |
| 2018/0050502 A1 | 2/2018 | Oldani | | |
| 2018/0056602 A1* | 3/2018 | Susnjara | ............. | B33Y 10/00 |

* cited by examiner

ADDITIVE MANUFACTURING APPARATUS

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process commonly referred to as Fused Deposition Modeling (FDM) or Fused Layer Modeling (FLM) comprises melting a thin layer of thermoplastic material, and applying this material in layers to produce a final part. This is commonly accomplished by passing a continuous thin filament of thermoplastic material through a heated nozzle, or by passing thermoplastic material into an extruder, with an attached nozzle, which melts it and applies the thermoplastic material and applies the melted thermoplastic material to the structure being printed, building up the structure. The heated material may be applied to the existing structure in layers, melting and fusing with the existing material to produce a solid finished part.

The filament used in the aforementioned process may be produced by, for example, using an extruder, which may include a steel extruder screw configured to rotate inside of a heated steel barrel. Thermoplastic material in the form of small pellets may be introduced into one end of the rotating screw. Friction from the rotating screw, combined with heat from the barrel may soften the plastic, which may then be forced under pressure through a small round opening in a die that is attached to the front of the extruder barrel. In doing so, a "string" of material may be extruded, after which the extruded string of material may be cooled and coiled up for use in a 3D printer or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to a final size may be compensated for by the faster printing process.

A common method of additive manufacturing, or 3D printing, may include forming and extruding a bead of flowable material (e.g., molten thermoplastic), applying the bead of material in a strata of layers to form a facsimile of an article, and machining the facsimile to produce an end product. Such a process may be achieved using an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or a combination of materials) to enhance the material's strength.

The flowable material, while generally hot and pliable, may be deposited upon a substrate (e.g., a mold), pressed down or otherwise flattened to some extent, and leveled to a consistent thickness, e.g., by means of a tangentially compensated roller. The roller may be mounted in or on a rotatable carriage, which may be operable to maintain the roller in an orientation tangential, e.g., perpendicular, to the deposited material (e.g., a bead or beads). In some embodiments, the roller may be smooth and/or solid. The flattening process may aid in fusing a new layer of the flowable material to the previously deposited layer of the flowable material. The deposition process may be repeated so that each successive layer of flowable material is deposited upon an existing layer to build up and manufacture a desired component structure. In some instances, an oscillating plate may be used to flatten the bead of flowable material to a desired thickness, thus effecting fusion to the previously deposited layer of flowable material. In order to achieve proper bonding between printed layers, the temperature of the layer being printed upon must cool, and solidify sufficiently to support the pressures generated by the application of a new layer. The layer being printed upon must also be warm enough to fuse with the new layer. When executed properly, the new layer of flowable material may be deposited at a temperature sufficient to allow the new layer to melt and fuse with the new layer, thus producing a solid part.

In the practice of the aforementioned additive manufacturing processes (e.g., a 3D printing process), an extruder, of the type used in near net shape 3D printing, may be designed to operate at a steady (e.g., constant) flow rate in order to produce a steady (e.g., consistent), homogeneously melted thermoplastic bead. However, the print head may move at variable speeds throughout the printing process. As such, a print bead that varies in size may be produced. That is, the print bead may be thicker when the machine is moving slowly, and thinner when the machine operates at a relatively higher speed.

One method employed to maintain print bead size (e.g., thickness) may include controlling a servomotor that rotates the extruder screw within the barrel of the extruder. For example, the rotational speed of the extruder screw may be increased when the machine is moving faster, and, additionally or alternatively, the rotational speed of the extruder screw may be decreased if the motion of the machine motion slows. However, the flow rate from the extruder at any point in time is determined not only by the rotational speed of the extruder screw, but also by the recent history of speed of rotation of the extruder screw. For example, the rotational speed of the extruder screw affects the amount of heat energy generated for melting the flowable material, and consequentially the viscosity of the flowable material. In other words, faster rotation of the extruder screw will result in a greater amount of heat energy being imparted to the flowable material, thereby reducing the viscosity of the flowable material. Changing the extruder screw speed may not immediately change the temperature and viscosity of the flowable material. Therefore, if the extruder screw is servo-controlled to operate at a specific rotational speed for a specific velocity of the print head movement, the resulting printed bead may not be consistent. Thus, a melt pump (e.g., a gear pump) may be used with a similar modified servo-controlled approach which may produce a consistently sized print bead when 3D printing. In this process, the extruder screw is controlled to rotate so that a relatively consistent pressurized pool of molten material may be provided to the inlet side of the gear pump. The gear pump may also pull a volume from the pool of molten material with each revolution of the gears. The gear speed of the gear pump may be adjusted in relation to movement of the CNC machine in order relatively accurately control the width of the bead formed from the molten material at various CNC machine speeds.

In a traditional additive manufacturing machine the extruder may be attached to the melt pump using a connecting device, such as, for example, a clamp or a transition plate. When using a clamp, one end of the clamp mechanism may be attached (e.g., bolted) to the output end of the extruder barrel while another end of the clamp mechanism is attached to an input end of the melt pump. The clamping device draws the two ends tightly together to secure the melt pump to the extruder. When using a transition plate, the transition plate may be attached (e.g., bolted) between the extruder and the melt pump. The transition plate may be drilled and/or tapped to exhibit holes that align with holes in both the output end of the extruder barrel and the input end of the melt pump. As such, any connecting device used will have a channel to allow heated printing material to flow from the extruder, through the connecting device, and into the melt pump. Such an arrangement may be inadequate for printing with a variety of printing materials having varying melting points.

Problems are most prevalent when attempting to change from printing materials (e.g., polymers) having a relatively high melting point (e.g., 750° F.) to printing materials (e.g., polymers) having a relatively low melting point (e.g., 500° F.). For example, changing from printing polyethersulfone (PESU) having a melting temperature of about 720° F. to printing acrylonitrile butadiene styrene (ABS) having a melting temperature of about 450° F., may present challenges. Although the following description will describe the process of changing from one polymer to another polymer, it should be noted that the process may apply similarly to any two printing materials having different melting points. The melting point of thermoplastic polymers used for 3D printing may vary from polymer to polymer. The polymers will begin to soften when heated to a temperature close to their melting point, and the polymers will begin to flow when heated to temperatures at or above their melting point. Polymers used as printing materials tend to be highly viscous at temperatures near their melting point, but become less viscous as their temperature is increased. When heated to temperatures significantly above their melting point (e.g., 100-200° F. above their melting point) the viscosity of the polymers is significantly reduced such that the polymers are almost liquid.

Changing an additive manufacturing process from using a first printing material to a second printing material, different than the first printing material, may be referred to as a "changeover" process. Before and/or during a changeover process, it may be necessary to completely purge the first printing material from the print head via the second printing material before printing with the second printing material. For example, extrusion of the second printing material may push or urge any remaining first printing material from the system. That is, when changing from a printing material having a lower melting point to a printing material having a higher melting point, at least part of the print head may initially contain the first printing material having a lower melting point from a previous printing step which may need to be purged, removed, or otherwise replaced with the second printing material having a higher melting point.

The changeover process may begin by heating the print head to a temperature slightly above the melting point of the second printing material with the higher melting point to process (e.g., melt) the second printing material having the higher melting point. In doing so, the first printing material with the lower melting point remaining in the print head will be heated significantly above its melting point, thus reducing the viscosity of the remaining first printing material until it flows freely. Once the temperature of the extruder is sufficiently high to process the second printing material having a higher melting point, the second printing material is introduced into the extruder. Since the second printing material is heated to a temperature nearer to its melting point, the second printing material may have a much higher viscosity than the remaining first printing material. Thus, the second printing material with a higher viscosity may push the remaining, lower viscosity first printing material out of the print head.

A problem may occur, however, when attempting to change from a first printing material having a relatively high melting point to a second printing material different than the first printing material, having a relatively lower melting point. In this case, at least part of the print head, e.g., a channel extending from the extruder to gears in the melt pump, may be at least partially filled with the first printing material having a higher melting point. In order to soften this material sufficiently to allow the second printing material having the lower melting point to purge the first printing material from the system, the temperature of the print head must be raised above the melting point of the remaining first printing material having the relatively higher melting point. If the second printing material having the relatively lower melting point is introduced in an attempt to purge out the remaining first printing material when the temperature of the print head is significantly above the melting point of the second printing material, the second printing material will be significantly less viscous than the remaining first printing material that the changeover process is trying to remove. As a result, rather than completely purging the remaining first printing material, the second printing material having a lower melting point and low viscosity may pass through the remaining first printing material having a higher viscosity. For example, the second printing material may form (e.g. tunnel, cut, etc.) a passage extending through the remaining first printing material, thereby resulting in a collar, or band of unpurged remaining first printing material left over in the channel.

If the print head is cooled to a temperature near the melting point of the second printing material having the relatively lower melting point, some of the remaining first printing material having the relatively higher melting point may cool to a temperature significantly below its melting point and harden in the print head. Such material remaining in the channel after the changeover process may create a number of problems. For example, left over material may narrow a cross-sectional dimension (e.g., diameter) of the channel thereby reducing the flow of material through the system and/or create uncontrolled flow patterns through the print head. Further such, left over material may introduce contamination into the newer printing material. For example, pieces of the hardened left over material may flake off into the newer printing material. Moreover, the hardened leftover material may insulate pressure or temperature sensors located adjacent to channel which may lead to inaccurate measurements on parameters critical to machine operation. Thus, a method and apparatus are desired to allow the change from printing materials having a relatively high melting point to printing materials having a relatively low melting point, while minimizing any material left in the print head as result of the changeover process.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. In one aspect, the present disclosure relates to minimizing or eliminating printing material remaining in the print head of an additive manufacturing machine (e.g., a 3D printer) during a changeover process, e.g., when changing from printing materials having a relatively high melting point to printing materials having a relatively lower melting point.

Some additive manufacturing apparatuses include an extruder (e.g., including an extruder screw rotatably positioned within a barrel) flowably connected to a melt pump (including melt pump gears). Generally, the extruder screw extends to a point approximately even or aligned with a terminal end of the extruder barrel. A channel may be created between the output (e.g., the terminal end) of the extruder barrel (at the end of the extruder screw) and the gears of the melt pump. The gears of the melt pump, which deliver printing material from the extruder, are generally located in a center of the melt pump spaced from an infeed end of the melt pump. Therefore, if the melt pump is directly attached to the terminal end of the extruder barrel, a channel extends from the infeed end of the melt pump to the gears of the melt pump. As noted above, printing material may remain in the channel during a changeover process, which may contribute to deficiencies in the printing process.

Another aspect of the present disclosure may include an infeed channel of the melt pump having a dimension (e.g., an internal diameter) equal to a cross-sectional dimension (e.g., an internal diameter) of the extruder barrel. In some aspects, the infeed channel of the melt pulp may be machined (or otherwise altered) to match the inside diameter of the extruder barrel. The melt pump may be attached directly to the end of the extruder barrel so that the channel inside the melt pump aligns with a bore of the extruder barrel. Additionally, the extruder screw may protrude through the terminal end of the extruder barrel and at least partially into the melt pump (e.g., into the infeed channel). The extruder screw may extend into the melt pump to a location nearly touching the gears of the melt pump, as will be described in further detail below.

This arrangement between the extruder screw and the melt pump may reduce, to the extent possible, the length of the channel through which printing material is passed between the output of the extruder and the gears of the melt pump, thereby minimizing or eliminating the material that needs to be purged during a changeover process, e.g., from a polymer having a higher melting point to a polymer having a lower melting point.

As used herein, the terms "comprises," "comprising," or any other variation thereof, are intended to cover a non-exclusive inclusion, such as a process, method, article, or apparatus. The term "exemplary" is used in the sense of "example," rather than "ideal." As used herein, the terms "about," "generally," "substantially," and "approximately," indicate a range of values within +/−5% of the stated value unless otherwise stated.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components, parts, or articles via additive manufacturing such as, e.g., 3D printing. Specifically, the methods and apparatus described herein may be drawn to minimizing or eliminating the channel extending between the output of an extruder and gears of a gear pump, and methods of using the same.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
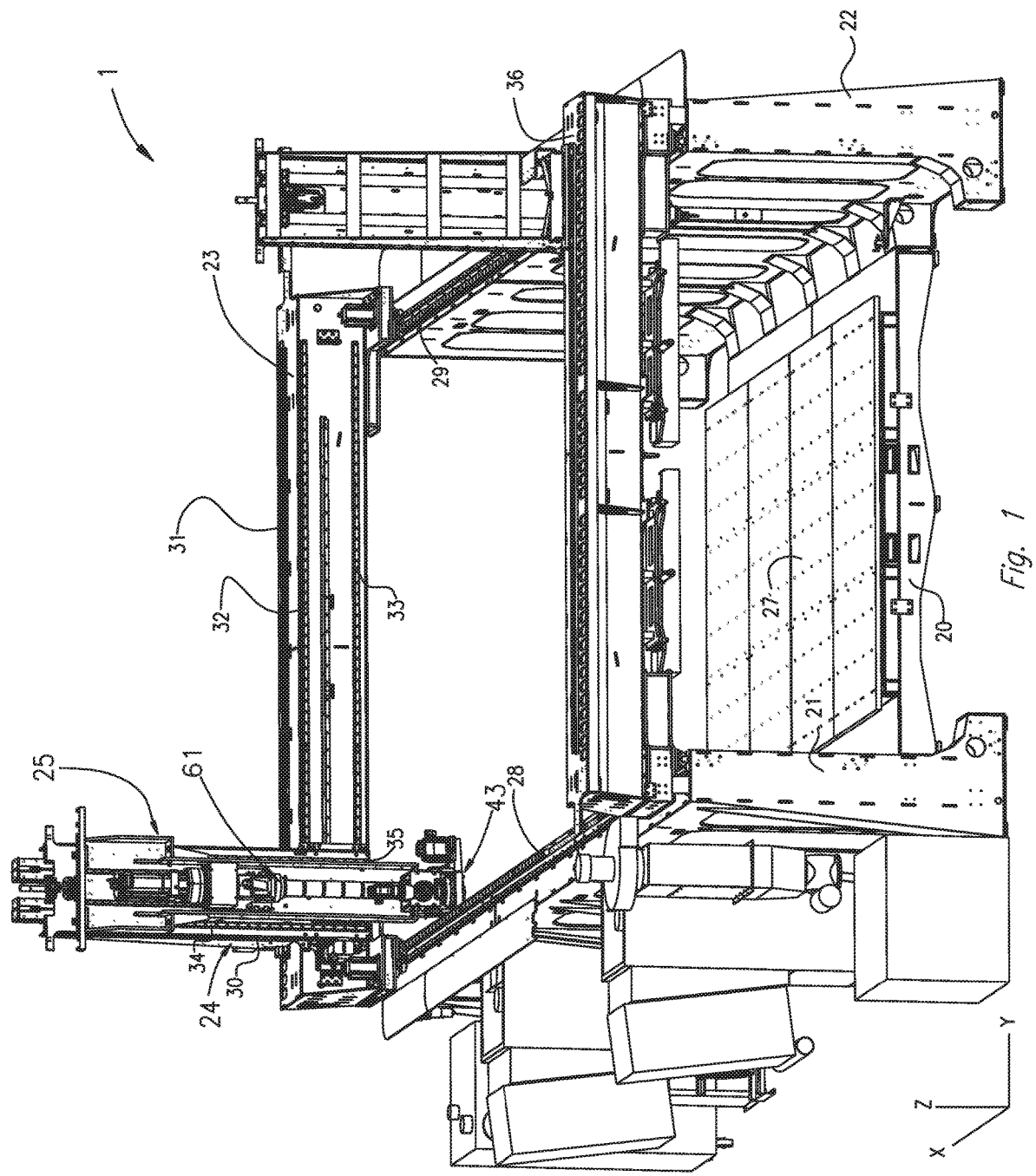
FIG. 1 is a perspective view of an exemplary CNC machine operable pursuant to an additive manufacturing process to form articles or parts, according to an aspect of the present disclosure.

Referring to FIG. 1, there is illustrated a CNC machine 1 embodying aspects of the present disclosure. CNC machine 1 may include a controller operatively connected to CNC machine 1 for displacing an applicator nozzle 51 along a longitudinal line of travel, or x-axis, a transverse line of travel, or a y-axis, and a vertical line of travel, or z-axis, in accordance with a program, (e.g., a CNC program) inputted or loaded into the controller for performing an additive manufacturing process to form a desired component, as will be described in further detail below. CNC machine 1 may be configured to print or otherwise build 3D parts from digital representations of the 3D parts (e.g., AMF and STL format files).

For example, in an extrusion-based additive manufacturing system (e.g., a 3D printing machine), a 3D part may be printed from a digital representation of the 3D part in a layer-by-layer manner by extruding a flowable material (e.g., thermoplastic material with or without reinforcements). The flowable material may be extruded through an extrusion tip or nozzle 51 carried by a print head 99 of the machine 1, and the flowable material may be deposited as a sequence of beads or layers on a substrate in an x-y plane. The extruded, flowable material may fuse to a previously deposited layer of material and may solidify upon a drop in temperature. The position of print head 99 relative to the substrate may then be incrementally advanced along a z-axis (perpendicular to the x-y plane), and the process may then be repeated to form a 3D part resembling the digital representation.

CNC machine 1, as shown in FIG. 1, includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61, and an applicator assembly (also referred herein as an applicator head) 43 mounted on carrier 25. Located on bed 20 between side walls 21 and 22 is a worktable 27 provided with a support surface. The support surface may be disposed in an x-y plane and may be fixed, or displaceable, along an x-axis and/or a y-axis. For example, in a displaceable version, worktable 27 may be displaceable along a set of rails mounted to bed 20. Displacement of worktable 27 may be achieved using one or more servomotors and one or more of guide rails 28 and 29 mounted on bed 20 and operatively connected to worktable 27. Printing gantry 23 is disposed along the y-axis, supported on side walls 21 and 22. In FIG. 1, printing gantry 23 is mounted on the set of guide rails 28 and 29, which are located along a top surface of side walls 21 and 22.

Printing gantry 23 may either be fixedly or displaceably mounted, and in some aspects, printing gantry 23 may be disposed along the x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 is supported on printing gantry 23 and is provided with a support member 30 mounted on and displaceable along one or more guide rails 31, 32 and 33 provided on printing gantry 23. Carriage 24 may be displaceable along a y-axis on one or more guide rails 31, 32 and 33 by a servomotor mounted on the printing gantry 23 and operatively connected to support member 30. Carrier 25 is mounted on one or more vertically disposed guide rails 34 and 35 supported on carriage 24 for displacement of carrier 25 relative to carriage 24 along the z-axis. Carrier 25 may be displaceable along the z-axis by a servomotor mounted on carriage 24 and operatively connected to carrier 25.

Figure 2:
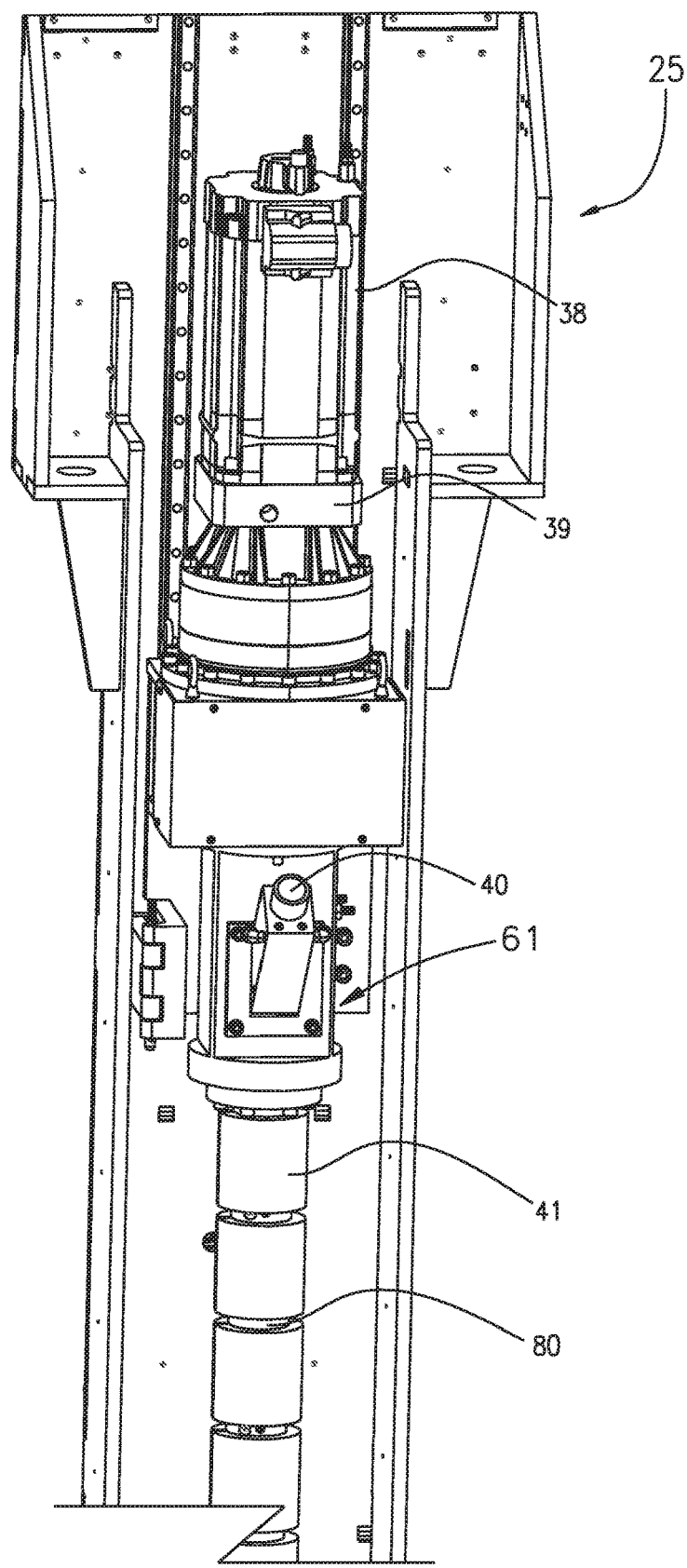
FIG. 2 is an enlarged perspective view of an exemplary carrier and extruder of the exemplary CNC machine shown in FIG. 1.

As best shown in FIG. 2, mounted to carrier 25 is extruder 61, which may be larger than extruders used for standard 3D printing. Extruder 61 may be capable of extruding a flowable material (e.g., thermoplastic material) at a rate of about 110 pounds per hour up to 500 pounds per hour, allowing for a significantly faster printing rate. Extruder 61 may be large enough and may allow for a high enough throughput of flowable material to print the largest layer desired within a period of time permitted by the flowable material's natural cooling properties.

An extruder screw 81 (FIG. 6) may be disposed within an extruder barrel 80 of extruder 61. The screw may be actuated, or driven, by a servomotor 38, which may be operatively connected to extruder screw 81 via a gearbox 39. One or more heaters 41 may surround at least a portion of extruder barrel 80, as shown. In some embodiments, heaters 41 may wrap around a circumference of extruder barrel 80. Heaters 41 may be disposed along a portion or along the entire length of barrel 80.

Pellets of material (e.g., thermoplastic material) may be introduced into a supply opening 40 of extruder barrel 80. Those of ordinary skill will recognize that the pellets may be of any suitable material, for example, thermoplastic material. The material may also be delivered to extruder barrel 80 in any suitable size and/or configuration, in addition to, or instead of, pellets. In an exemplary embodiment, the pellets introduced into extruder barrel 80 may be heated by the friction generated from rotation of extruder screw 81 and/or by one or more heaters 41 disposed along the length of extruder barrel 80. In an exemplary embodiment, once the pellets have melted, the molten material may be forced under pressure by extruder screw 81 further into extruder barrel 80 and out of a terminal end or bottom opening (FIG. 6) of extruder barrel 80. The flowable material may be delivered to nozzle 51 (FIG. 3) to be deposited, as further described below.

Figure 3:
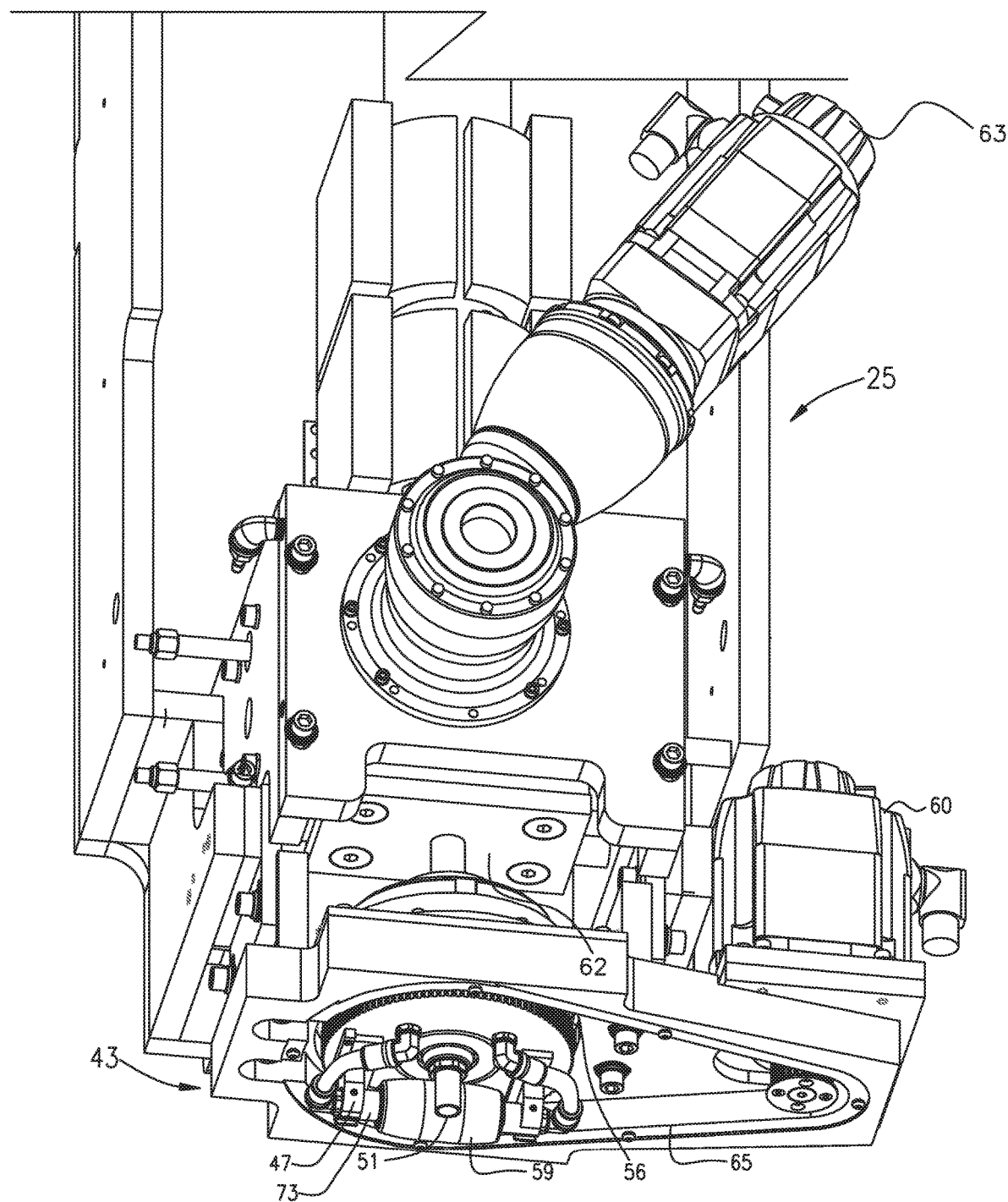
FIG. 3 is an enlarged perspective view of an exemplary carrier and applicator head assembly of the exemplary CNC machine shown in FIG. 1.
Figure 4:
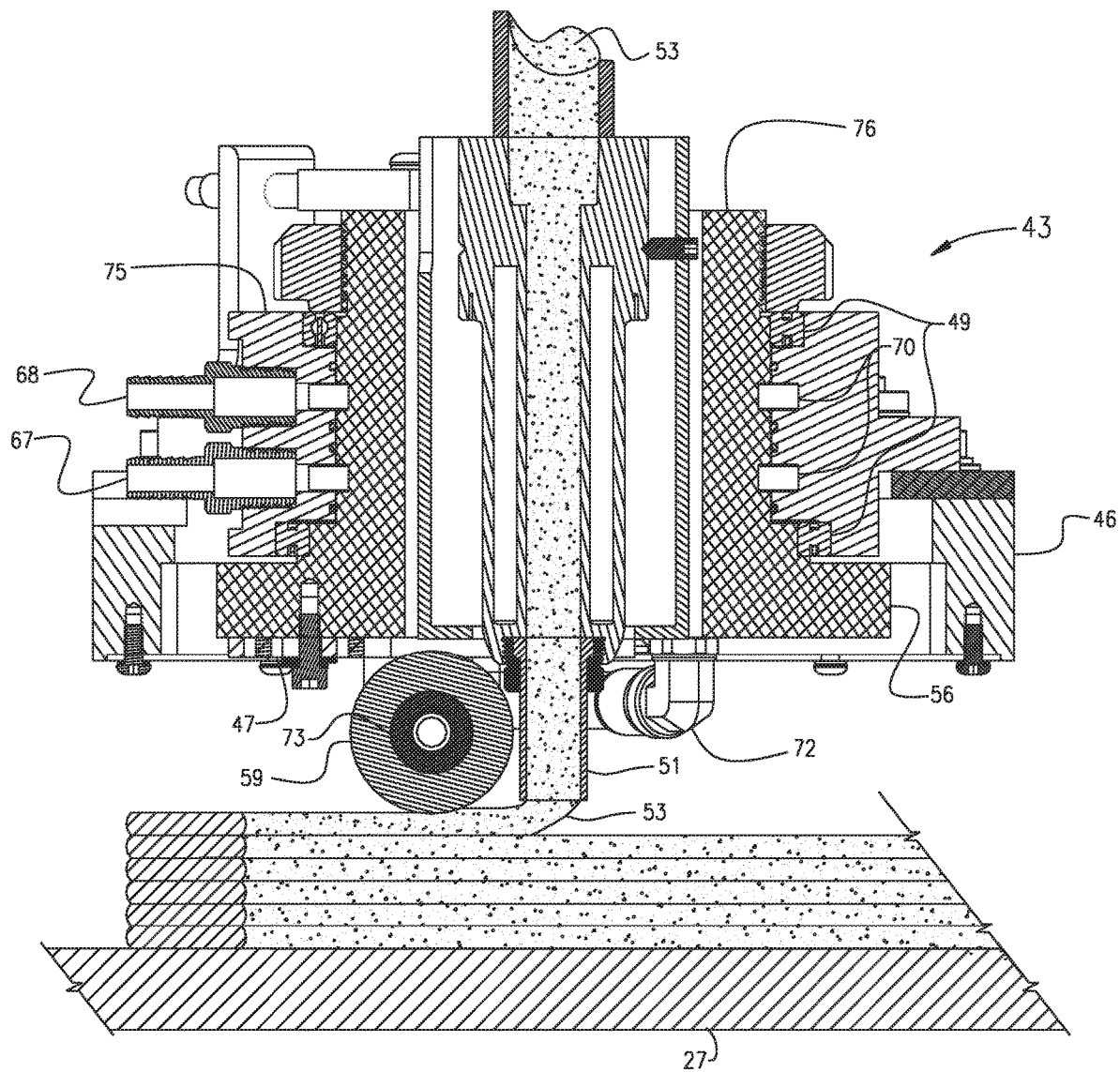
FIGS. 4 and 5 are enlarged cutaway views of the exemplary applicator head assembly shown in FIG. 3.
Figure 6:
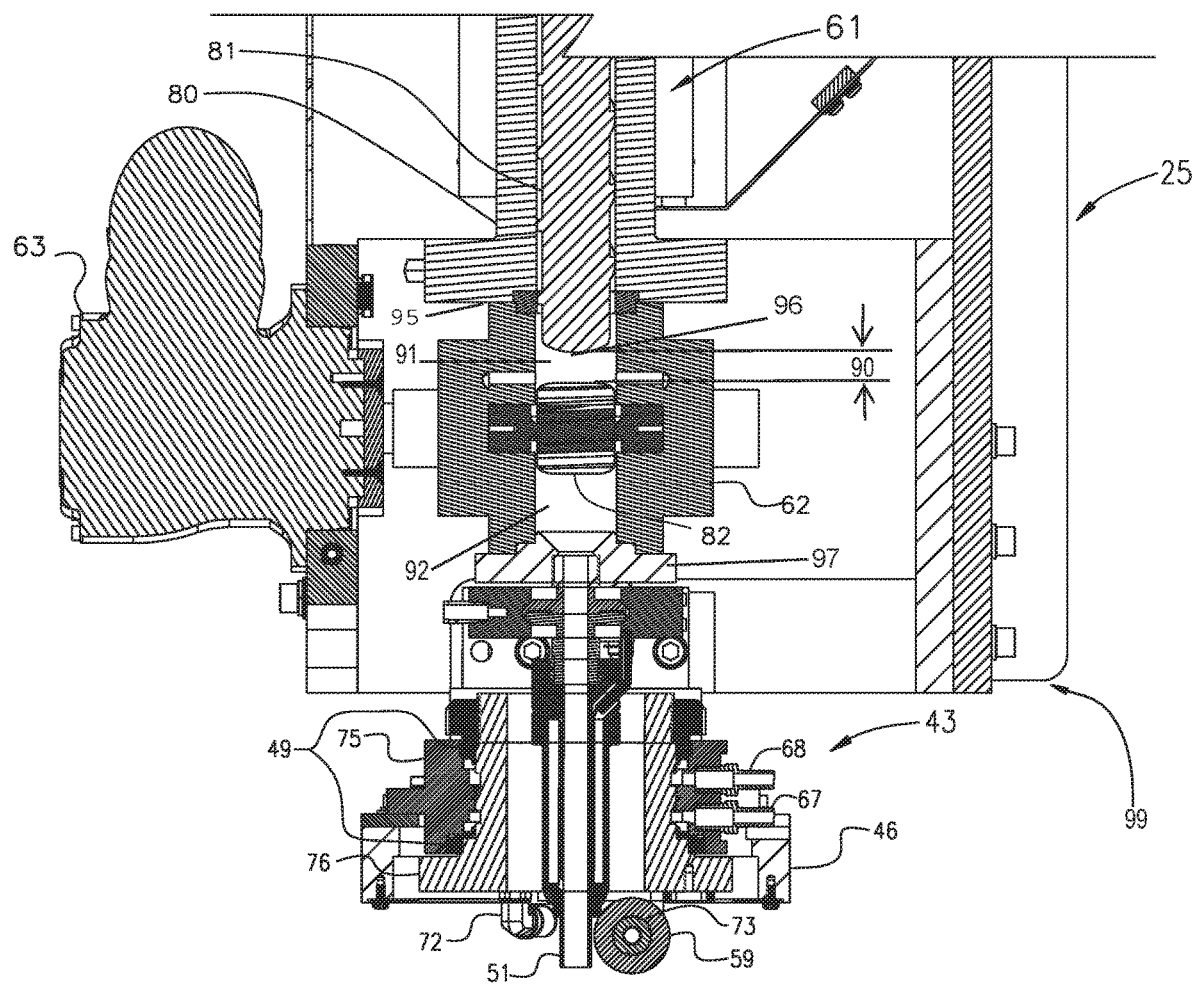
FIG. 6 is a cutaway view of the enlarged perspective view of the exemplary carrier and applicator head assembly shown in FIG. 3.

As shown in FIG. 3, also mounted to carrier 25 (e.g., fixedly mounted to the bottom of carrier 25) is a positive displacement gear pump 62, (e.g. melt pump), which may be driven by a servomotor 63, through a gearbox (not shown) Gear pump 62 receives molten plastic from extruder 61 through a channel 90 (FIG. 6). A compression roller 59, rotatable about a nonrotatable (e.g., fixed) axle 73, for compressing deposited flowable material (e.g., thermoplastic material) may be mounted on a carrier bracket 47. Roller 59 may be movably mounted on carrier bracket 47, for example, rotatably or pivotably mounted. Roller 59 may be mounted so that a center portion of roller 59 is aligned with a nozzle 51 of applicator head 43, and roller 59 may be oriented tangentially to nozzle 51. Roller 59 may be mounted relative to nozzle 51 so that material, e.g., one or more beads of flowable material (such as thermoplastic resins), discharged from nozzle 51 are smoothed, flattened, leveled, and/or compressed by roller 59, as depicted in FIG. 4. One or more servomotors 60 may be configured to move, e.g., rotationally displace, carrier bracket 47 via a pulley 56 and belt 65 arrangement. In some embodiments, carrier bracket 47 may be rotationally displaced via a sprocket and drive-chain arrangement (not shown), or by any other suitable mechanism.

With continuing reference to FIG. 4, applicator head 43 may include a housing 46 having a rotary union mounted therein. Such a rotary union may include an inner hub 76 rotatably mounted within and relative to an outer housing 75. For example, inner hub 76 may rotate about a longitudinal axis thereof relative to outer housing 75 via one or more roller bearings 49. Carrier bracket 47 may be mounted, e.g., fixedly mounted to inner hub 76, journaled in roller bearing 49. Roller bearing 49 may allow roller 59 to rotate about nozzle 51.

As shown in FIG. 4, an oversized molten bead of a material 53 (e.g., a thermoplastic material) under pressure from a source disposed on carrier 25 (e.g., one or more of extruder 61 and an associated polymer or gear pump 62) may be flowed to applicator head 43, which may be fixedly (or removably) connected to, and in communication with nozzle 51. In use, material 53 (e.g., melted thermoplastic material) may be heated sufficiently to form a large molten bead thereof, which may be delivered through applicator nozzle 51 to form multiple rows of deposited material 53 on a surface of worktable 27. In some embodiments, beads of molten material deposited by nozzle 51 may be substantially round in shape prior to being compressed by roller 59. Exemplary large beads may range in size from approximately 0.4 inches to over 1 inch in diameter. For example, a 0.5 inch bead may be deposited by nozzle 51 and then flattened by roller 59 to a layer approximately 0.2 inches thick by approximately 0.83 inches wide. Such large beads of molten material may be flattened, leveled, smoothed, and/or fused to adjoining layers by roller 59.

Although roller 59 is depicted as being integral with applicator head 43, roller 59 may be separate and discrete from applicator head 43. In some embodiments, roller 59 may be removably mounted to CNC machine 1. For example, different sized or shaped rollers 59 may be interchangeably mounted on CNC machine 1, depending, e.g., on the type of material 53 and/or desired characteristics of the rows of deposited flowable material formed on worktable 27.

In some embodiments, CNC machine 1 may include a velocimetry assembly (or multiple velocimetry assemblies) configured to determine flow rates (e.g., velocities and/or volumetric flow rates) of deposited material 53 being delivered from applicator head 43. The velocimetry assembly may transmit signals relating to the determined flow rates to the aforementioned controller coupled to CNC machine 1, which then may utilize the received information to compensate for variations in the material flow rates.

In the course of fabricating an article or component, pursuant to the methods described herein, the controller of CNC machine 1, in executing the inputted program, may control several servomotors described above to displace gantry 23 along the x-axis, displace carriage 24 along the y-axis, displace carrier 25 along the z-axis, and/or rotate carrier bracket 47 about the z-axis while nozzle 51 deposits material 53 and roller 59 compresses the deposited material. In some embodiments, roller 59 may compress material 53 in uniform, smooth rows.

A circumferential outer surface of inner hub 76 may include or define pulley 56. For example, as shown in FIG. 3, pulley 56 may include a radially outward-most portion of inner hub 76. Although pulley 56 is depicted as being integral with inner hub 76, pulley 56 may be separate and discrete from inner hub 76. Additionally, inner hub 76 may include an opening having a dimension (e.g., diameter) sufficient to allow nozzle 51 to pass therethrough.

Figure 5:
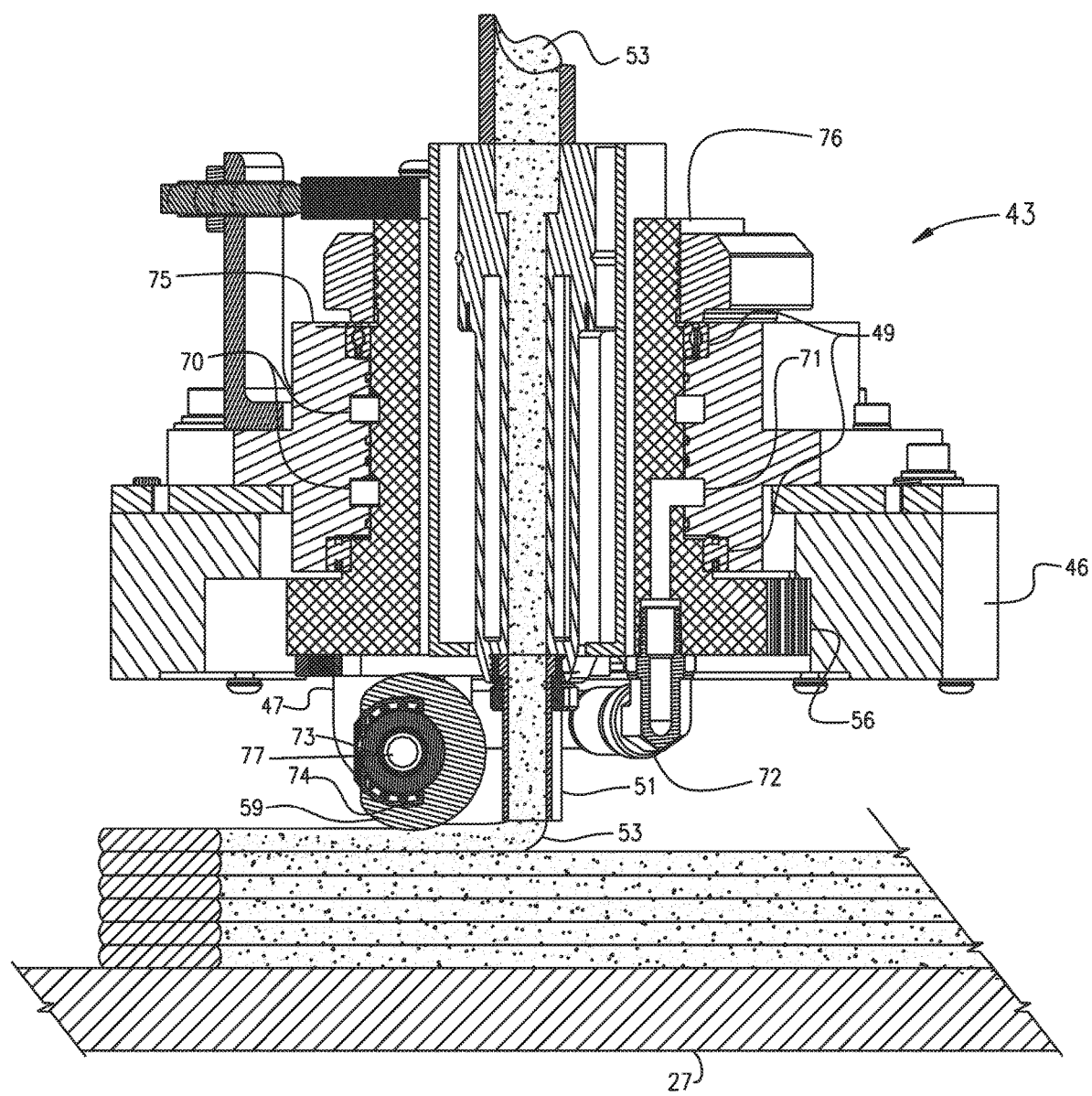

Outer housing 75 may include one or more barb fittings 67, 68. Coolant may enter a barb fitting 67 and may be introduced inside of housing 46 of applicator head 43. Each barb fitting 67 and 68 may be fluidly coupled to one or more passages extending through applicator head 43. For example, each of barb fittings 67 and 68 may be coupled to one or more coolant passages 70. As shown in FIGS. 4 and 5, coolant passages 70 may extend between outer housing 75 and inner hub 76. Additionally, coolant passages 70 may couple to one or more passages 71 and quick connect fitting 72, as shown in FIG. 5. Quick connect fitting 72, in turn, may be fluidly coupled to an interior bore, passage, or lumen extending through the axle 73 so as to directly cool the axle 73, and thereby, roller 59. Each of coolant passages 70 and passages 71 may be disposed within applicator head 43 to direct the coolant within applicator head 43 during operation of CNC machine 1, e.g., when printing a part. As shown in FIGS. 4 and 5, for example, each of coolant passages 70 may extend along an axis generally perpendicular to the longitudinal axis of nozzle 51 while passages 71 may extend generally parallel with the longitudinal axis of nozzle 51. It is understood, however, that the disclosure is not so limited. Any or all of coolant passages 70 and/or passages 71 may extend along an axis nonparallel or nonperpendicular to the longitudinal axis of nozzle 51.

Regardless of the configuration, orientation, shape, or arrangement thereof, barb fitting 67, coolant passage 70, passage 71, quick connect fitting 72, axle 73, and barb fitting 68 may collectively form a cooling circuit for cycling or otherwise introducing and removing coolant from applicator head 43. For example, an inlet portion of barb fitting 67 may be fluidly connected to a source of coolant (not shown). Once within applicator head 43, the coolant may absorb heat and may cool outer housing 75, inner hub 76, and axle 73 as it flows therethrough. In addition, due to the proximity of roller 59 to axle 73, passage of coolant through axle 73 may result in likewise cooling of roller 59. The coolant may exit from one or more barb fittings 68 and may return to a chiller to be cooled back down to an appropriate temperature. The coolant may be cooled down to a temperature below that at which deposited material 53 may begin to adhere to roller 59. This temperature may vary depending on the type of material 53 used and may be below the melting point of that material. In some examples, the coolant may be a liquid coolant, such as, e.g., water, antifreeze, ethylene glycol, diethylene glycol, propylene glycol, betaine, or any other suitable liquid coolants or combinations thereof.

As shown in FIG. 5, axle 73 passes through a central lumen 77 of roller 59. Additionally, one or more low friction bearing(s) 74 may be located between axle 73 and roller 59, thereby allowing roller 59 to rotate about axle 73, without axle 73 contacting roller 59. A thin layer of air may exist in a gap between an outer surface of axle 73 and a surface of lumen 80 of roller 59 such that it is possible to cool the roller while maintaining nearly friction free rotation of roller 59. Additionally, the gap between axle 73 and compression roller 59 may be filled with a material with better heat transfer properties than air. For example, a material such as atomized copper powder may be positioned in the gap. As an alternative, a low viscosity material such as copper-filled anti-seize compound may be positioned in the gap. Such materials may impart only a slight increase in rotational friction between the axle 73 and the roller 59, while offering a dramatic increase in heat transfer properties, thereby permitting heat transfer between the compression roller 59 and the axle 73.

As shown in FIG. 6, a print head 99 may include at least the output of the extruder 61, the gear pump 62, and the applicator head 43. Gear pump 62 may be attached (e.g., coupled or welded) to terminal end 95 of extruder barrel 80. For example, gear pump 62 may be coupled directly to terminal end 95 of extruder barrel 89 without a transition plate, clamp mechanism, or other connecting device. Gear pump 62 may be attached to extruder 61 so that an infeed opening 91 of gear pump 62 is axially aligned with extruder barrel 80. For example, terminal end 95 of extruder barrel 80 may be arranged to abut an infeed end of gear pump 62. In some arrangements, a cross-sectional dimension (e.g., an inner diameter) of the bore of extruder barrel 80 may be the same as a cross-sectional dimension (e.g., an inner diameter) of infeed opening 91. As mentioned above, a channel 90 may extend between the extruder output to the gears of the gear pump 62. In some cases, the output of extruder 61 is defined as terminal end 95 of extruder barrel 80. However, if extruder screw 81 extends beyond (e.g., downstream) terminal end 95 of extruder barrel 80, the extruder output is defined by the terminal end 96 of the extruder screw 81. Terminal end 95 of extruder barrel 80 may have a flange extending orthogonal to an axis of the extruder barrel 80 to which one or more portions of gear pump 62 may be coupled in any appropriate manner. Extruder barrel 80 and extruder screw 81 may comprise a metal or an alloy, e.g., steel. Terminal end 96 of extruder screw 81 may be rounded, concave, convex, conical, or other otherwise shaped to add or remove more or less of the volume of channel 90 between extruder screw 81 and gears 82. For example, as shown in FIG. 6, terminal end 96 may be rounded, e.g. exhibiting a blunt shape. Additionally or alternatively, terminal end 96 may be complimentary to the shape of gears 82, e.g., concave or convex. In at least one example, terminal end 96 of extruder screw 81 is conical with a base diameter about equal to a diameter of one or more of gears 82.

With further reference to FIG. 6, in some arrangements, extruder screw 81 protrudes out of extruder barrel 80, past terminal end 95, and at least partially into infeed opening 91 of gear pump 62. As such, the length of channel 90 (e.g., the distance between extruder screw 81 terminal end 96 and gears 82 of gear pump 62) is less than about 0.800 inches, e.g., less than 0.75 in., less than 0.65 in., less than 0.60 in., less than 0.55 in., less than 0.50 in. less than 0.45 in., less than 0.40 in., less than 0.35 in., less than 0.30 in., less than 0.25 in., less than 0.20 in. or less than 0.15 in. For example, the distance between extruder screw 81 terminal end 96 and gears 82 may range from about 0.100 in. to about 0.755 in. such as, e.g., from about 0.150 in. to about 0.700 in., from about 0.200 to about 0.650 in., from about 0.250 in. to about 0.600 in., or from about 0.300 in. to about 0.550 in.

Material 53 (e.g., a thermoplastic material) may be flowed from extruder 61 through channel 90 into gear pump 62. Gear pump 62 and gears 82 may comprise any appropriate material and/or configuration. For example, any one or more of gear pump 62 or gears 82 may include steel, a metal alloy, a ceramic, or a combination thereof. Additionally, gears 82 may be spur gears or helical gears and arranged in a roots type configuration. After passing through channel 90, and around gears 82, material 53 may move out of gear pump 62 through an outlet opening 92. Outlet opening 92 is flowably connected to nozzle 51, such that, as noted above, material 53 travels from outlet opening 92 through nozzle 51 to be deposited onto a substrate. As shown in FIG. 6, outlet opening 92 may be connected to nozzle 51 through a transition plate 97. In alternative examples, gear pump 62 may directly abut applicator head 43 without a transition plate 92 or other connecting device.

As mentioned above, when operating the CNC machine 1, the material 53 used in the printing process may be changed from one material (e.g., a first material) to another material (e.g., a second material) through a changeover process. For example, the changeover process may begin by introducing the second material into extruder 61 (e.g., via supply opening 40, FIG. 2). At this point in the changeover process, the channel 90 may be at least partially filled with previously used printing material (e.g., remaining first material). By operating the CNC machine 1 using the second material, the pressure and force of the second material may force (e.g., push, urge, etc.) remaining first material already in CNC machine 1 through extruder 61, gear pump 62, and out of nozzle 51. However, the characteristics (e.g., thermal or rheological) of the remaining first material and the second material may affect the changeover process, requiring the CNC machine 1 to operate differently in order to process the second material.

For example, when changing from a first material having a relatively low melting point to a second material having a relatively high melting point, the changeover process may begin by heating the print head 99 to a temperature above the melting point of the second material. In doing so, the remaining first material with the relatively lower melting point in print head 99 may be heated substantially above its melting point. Accordingly, the viscosity of the remaining first material may decrease so as to flow more freely. Once the temperature of print head 99 is high enough to process the second material having the relatively higher melting point, the second material is introduced into the extruder 61. Since the second material is nearer to its melting point, the second material has a higher viscosity than the remaining first material and therefore, the second material may, effectively push or urge the lower viscosity material out of the system.

As noted above, issues may arise when the changeover process includes changing from a first material having a relatively high melting point to a second material having a relatively low melting point. If the second material is introduced into extruder 61 in an attempt to purge out the first material remaining in print head 99 when the temperature of print head 99 is significantly above the melting point of the second material, the second material will be less viscous than the remaining first material that the second material is attempting to remove. As a result, the second, lower viscosity material may not remove substantially all of the higher viscosity first material remaining in print head 99, e.g., in channel 90.

Additionally, if print head 99 is cooled to a temperature near the melting point of the second material (having the relatively lower melting point), some of the remaining first material in the print head 99 may cool to a temperature significantly below its melting point and harden, causing issues as discussed above. Decreasing the length of the channel 90 (the distance between the output of the extruder 61 and gears 82 of gear pump 62) may minimize or eliminate the amount of remaining first material that needs to be purged. Therefore, CNC machine 1 may be able to change from printing materials having a higher melting point to printing materials having a lower melting point without the problems described above associated with traditional additive manufacturing machines. The changeover process may be repeated to change from the second material to a third material, or for any additional number of materials.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing system comprising:
   an extruder, including:
      a barrel including a bore; and
      an extruder screw at least partially received within the bore of the barrel; and
   a gear pump fluidly coupled to the bore of the barrel, the gear pump including an outlet opening including a narrowed portion axially aligned with the gear pump and extending within the gear pump;
   wherein the extruder screw extends beyond the barrel and at least partially into an inlet opening of the gear pump such that an end of the extruder screw is spaced apart from rotating components of the gear pump.

2. The additive manufacturing system of claim 1, wherein the rotating components are gears, wherein the inlet opening includes a channel extending from the end of the extruder screw to the gears, wherein an inner diameter of the channel is constant and about equal to an inner diameter of the barrel, and wherein the channel provides an unobstructed path from the end of the extruder screw to the gears.

3. The additive manufacturing system of claim 1, wherein the extruder is configured to receive a printing material, and wherein the system is configured to raise a temperature of a print head to about a melting point of the printing material.

4. The additive manufacturing system of claim 1, wherein a distance between the end of the extruder screw and a gear of the gear pump is from about 0.100 inches to about 0.755 inches.

5. The additive manufacturing system of claim 1, wherein a terminal end of the barrel directly abuts an end of the gear pump.

6. The additive manufacturing system of claim 1, wherein the extruder is configured to extrude a first printing material and a second printing material, and wherein a melting point of the first printing material is higher than a melting point of the second printing material.

7. The additive manufacturing system of claim 1, wherein the barrel is axially aligned with the gear pump.

8. The additive manufacturing system of claim 1, wherein the gear pump is driven by a first servomotor and the extruder screw is driven by a second servomotor.

9. The additive manufacturing system of claim 1, wherein the end of the extruder screw is spaced apart from a gear of the gear pump by a channel, the channel having a diameter that is about the same as an inner diameter of the inlet opening.

10. The additive manufacturing system of claim 1, wherein the narrowed portion of the outlet opening is formed by a transition plate abutting and extending within the gear pump, the additive manufacturing system further including a nozzle connected to the outlet opening by the transition plate.

11. The additive manufacturing system of claim 1, wherein the outlet opening includes an upstream outlet portion downstream of gears of the gear pump and upstream of the narrowed portion of the outlet opening, the upstream outlet portion having a constant inner diameter that is about equal to an inner diameter of the inlet opening.

12. The additive manufacturing system of claim 11, wherein the upstream outlet portion has a diameter that is about equal to an inner diameter of the bore of the barrel.

13. The additive manufacturing system of claim 1, further including a carrier, wherein the gear pump is fixedly mounted to a lower portion of the carrier, and wherein the additive manufacturing system further includes an applicator head extending from the lower portion of the carrier and fluidly connected to the gear pump.

14. The additive manufacturing system of claim 1, further including an applicator head having a nozzle extending therein, the nozzle in fluid communication with the gear pump, the gear pump abutting the applicator head or connected to the applicator head by a transition plate.

15. An additive manufacturing system comprising:
an extruder, including:
a barrel including a bore; and
an extruder screw at least partially received within the bore of the barrel; and
a gear pump fluidly coupled to the bore of the barrel, the gear pump being axially aligned with the barrel, the gear pump including an outlet opening including a narrowed portion axially aligned with the gear pump and extending within the gear pump, wherein a distance between an end of the extruder screw and a gear of the gear pump is from about 0.100 inches to about 0.755 inches.

16. The additive manufacturing system of claim 15, wherein the end of the extruder screw is spaced apart from the gear of the gear pump by a channel, the channel having a diameter that is about the same as an inner diameter of an inlet opening of the gear pump.

17. The additive manufacturing system of claim 15, wherein the extruder is configured to extrude a first printing material and a second printing material, and wherein a melting point of the first printing material is higher than a melting point of the second printing material.

18. The additive manufacturing system of claim 15, wherein a terminal end of the barrel directly abuts an end of the gear pump.

19. An additive manufacturing system comprising:
an extruder, including:
a barrel including a bore; and
an extruder screw at least partially received within the bore of the barrel;
a gear pump fluidly coupled to the bore of the barrel, the gear pump being axially aligned with the barrel, the gear pump including an outlet opening including a narrowed portion axially aligned with the gear pump, wherein an end of the extruder screw extends beyond the barrel and at least partially into an inlet opening of the gear pump such that a distance between the end of the extruder screw and a rotating component of the gear pump is from about 0.100 inches to about 0.755 inches; and
an applicator head having a nozzle extending therein, the nozzle in fluid communication with the gear pump, the gear pump abutting the applicator head or connected to the applicator head by a transition plate.

20. The additive manufacturing system of claim 19, wherein a connection between the barrel and the gear pump does not include a transition plate.

* * * * *